United States Patent
Grantham et al.

(10) Patent No.: US 6,293,996 B1
(45) Date of Patent: *Sep. 25, 2001

(54) FUEL STORAGE SYSTEM WITH VENT FILTER ASSEMBLY

(75) Inventors: Rodger P. Grantham, Springfield, MO (US); Glenn K. Walker, Springboro, OH (US)

(73) Assignee: Vapor Systems Technologies, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,520

(22) Filed: Nov. 15, 1999

Related U.S. Application Data

(63) Continuation-in-part of application No. 09/036,119, filed on Mar. 6, 1998, now Pat. No. 5,985,002.
(60) Provisional application No. 60/038,720, filed on Mar. 7, 1997.

(51) Int. Cl.[7] .................................................. B01D 63/00
(52) U.S. Cl. ................. 95/47; 95/54; 96/7; 96/9
(58) Field of Search ................... 96/4, 7, 8, 9; 95/45, 95/43, 47, 54, 50, 51

(56) References Cited

U.S. PATENT DOCUMENTS

| | | |
|---|---|---|
| 3,751,879 | 8/1973 | Allington . |
| 4,566,504 | 1/1986 | Furrow et al. . |
| 4,687,033 | 8/1987 | Furrow et al. . |
| 4,994,094 | 2/1991 | Behling et al. . |
| 5,035,271 | 7/1991 | Carmack et al. . |
| 5,051,114 | 9/1991 | Nemser et al. . |
| 5,141,037 | 8/1992 | Carmack et al. . |
| 5,305,807 | 4/1994 | Healy . |
| 5,464,466 | 11/1995 | Nanaji et al. . |
| 5,484,000 | 1/1996 | Hasselmann . |
| 5,494,409 | 2/1996 | Webb et al. . |
| 5,537,911 | 7/1996 | Ohlrogge et al. . |
| 5,571,310 | 11/1996 | Nanaji . |
| 5,590,697 | 1/1997 | Beniev et al. . |
| 5,592,963 | 1/1997 | Bucci et al. . |
| 5,592,979 | 1/1997 | Payne et al. . |
| 5,611,841 * | 3/1997 | Baker et al. ............................. 95/50 |
| 5,620,030 | 4/1997 | Dalhart et al. . |
| 5,620,031 | 4/1997 | Dalhart et al. . |
| 5,626,649 | 5/1997 | Nanaji . |
| 5,678,614 | 10/1997 | Grantham . |
| 5,843,212 | 12/1998 | Nanaji . |
| 5,985,002 * | 11/1999 | Grantham ................................. 95/47 |

FOREIGN PATENT DOCUMENTS

| | | |
|---|---|---|
| 2311768 | 10/1997 | (GB) . |
| 3-56114 | 3/1991 | (JP) . |
| 6-114229 | 4/1994 | (JP) . |
| WO 93/22031 | 11/1993 | (WO) . |

* cited by examiner

*Primary Examiner*—Duane S. Smith
(74) *Attorney, Agent, or Firm*—Killworth, Gottman, Hagan & Schaeff LLP

(57) ABSTRACT

A fuel storage system is provided including a storage tank, an exhaust port, a filter system, a primary pump, and at least one secondary pump. The storage tank includes a fuel delivery port, a fluid vent port, and a pollutant return port. The filter system includes a filter input port coupled to the fluid vent port, a fuel vapor duct, and primary and secondary filter output ports. The fuel vapor duct defines a flow path extending from the filter input port to the primary filter output port. The primary filter output port is coupled to the pollutant return port. At least a portion of the fuel vapor duct forms a permeable partition designed to pass a non-pollutant component of fluid within the fuel vapor duct through the permeable partition and designed to inhibit passage of a pollutant component of fluid within the fuel vapor duct through the partition. The secondary filter output port is partitioned from the fuel vapor duct by the air-permeable partition and is coupled to the exhaust port. The primary pump is positioned to cause fluid to pass from the filter input port to the primary filter output port. The secondary pump is positioned to cause the non-pollutant component within the fuel vapor duct to pass through the permeable partition to the secondary filter output port and the exhaust port.

23 Claims, 3 Drawing Sheets

FUEL STORAGE SYSTEM WITH VENT FILTER ASSEMBLY

CROSS REFERENCE TO RELATED APPLICATIONS

This application is a Continuation-in-Part of U.S. patent application Ser. No. 09/036,119, filed Mar. 6, 1998, now U.S. Pat. No. 5,985,002, for FUEL STORAGE SYSTEM WITH VENT FILTER ASSEMBLY, which application claims the benefit of U.S. Provisional Application Serial No. 60/038,720, FUEL STORAGE SYSTEM VENT FILTER SYSTEM, filed Mar. 7, 1997.

BACKGROUND OF THE INVENTION

The present invention relates to a system for reducing the discharge of pollutants from underground gasoline storage tanks. The system is arranged to discharge pollutant free air when the pressure within the system reaches a predetermined level. Air to be discharged is separated from gasoline vapor within the storage system prior to its discharge.

U.S. Pat. No. 5,464,466, to Nanaji et al., describes a fuel storage tank vent filter system where a filter or fractionating membrane is used to capture pollutants from the vapor vented from the system's fuel storage tanks. A property of the membrane is that it will capture or collect selected pollutants including hydrocarbons. The captured pollutants are drawn from the membrane as a liquid and returned to the fuel storage tanks. The fractionating membrane comprises a plurality of stacked and bound thin sheets. Each sheet has a hole formed in its center to form an aperture in the stack extending axially from end to end. A perforated removal pipe must be positioned in the axial aperture to enable the captured vapors to be drawn out of the membrane under a vacuum created by a vacuum pump. The throughput of the system is limited because pollutant molecules, as opposed to air molecules, must be pulled through the fractionating membrane in liquid form. U.S. Pat. No. 5,571,310 discloses the use of such a membrane in an organic chemical vent filter system. Harmful volatile organic compounds (VOC's) are drawn through the membrane by using a vacuum pump to create a pressure drop of one atmosphere across the membrane. The pump is positioned between the membrane and the tanks, as opposed to between the membrane and the atmosphere.

These prior art systems are inadequate, however, because, to achieve adequate throughput, a substantial pressure drop, e.g., one atmosphere, must be created across the fractionating membrane. Further, the fractionating membrane of these prior art systems, and the associated hardware, is typically too large and costly for many applications. The pumping and fluid transfer system is likely to be more costly and difficult to assemble because of the relatively high levels of vacuum created in the system. Finally, the prior art systems do not expel substantially pollutant free air to the atmosphere. Rather, pressure within the tanks is reduced by merely condensing the pollutant vapors to liquid and returning them to the tanks. Accordingly, there is a need for a compact fuel storage system vent filter assembly that provides improved filtering and throughput at a competitive cost.

BRIEF SUMMARY OF THE INVENTION

This need is met by the present invention wherein a fuel storage system vent filter assembly is provided that includes a fuel vapor duct defining a flow path extending from the filter input port to a primary filter output port. Air is drawn through an air-permeable partition and larger, less mobile, pollutant hydrocarbons or VOC's pass to an outlet duct essentially unobstructed by the partition.

In accordance with one embodiment of the present invention, a fuel storage system is provided comprising a storage tank, an exhaust port, a filter system, a primary pump, and at least one secondary pump. The storage tank includes a fuel delivery port, a fluid vent port, and a pollutant return port. The filter system comprises a filter input port coupled to the fluid vent port, a fuel vapor duct, and primary and secondary filter output ports. The fuel vapor duct defines a flow path extending from the filter input port to the primary filter output port. The primary filter output port is coupled to the pollutant return port. At least a portion of the fuel vapor duct forms a permeable partition designed to pass a non-pollutant component of fluid within the fuel vapor duct through the permeable partition and designed to inhibit passage of a pollutant component of fluid within the fuel vapor duct through the partition. The secondary filter output port is partitioned from the fuel vapor duct by the air-permeable partition and is coupled to the exhaust port. The primary pump is positioned to cause fluid to pass from the filter input port to the primary filter output port. The secondary pump is positioned to cause the non-pollutant component within the fuel vapor duct to pass through the permeable partition to the secondary filter output port and the exhaust port. The non-pollutant component may comprise, among other things, oxygen or water vapor. The system may further comprise a microwave unit arranged to direct microwave radiation at fluid released through the exhaust port.

The primary pump may have a characteristic pumping capacity capable of generating a first volumetric fluid flow rate. The secondary pump may have a characteristic pumping capacity capable of generating a second volumetric fluid flow rate through the permeable partition and the secondary filter output port to the exhaust port, and capable of generating, in combination with the primary pump, a third volumetric fluid flow rate through the primary filter output port. Preferably, the second volumetric fluid flow rate is greater than a characteristic average net fluid volume return rate of the fuel storage system. The second volumetric flow rate may be approximately two to eight times greater than the average net fluid volume return rate of the fuel storage system. For example, the second volumetric fluid flow rate may be between approximately 15 standard cubic feet per hour and approximately 150 standard cubic feet per hour. The secondary pump is preferably designed to be capable of creating a pressure drop of between about 25 to 100 kPa across the air-permeable partition. The fuel vapor duct and the primary pump are preferably arranged such that fluid passes from the filter input port to the primary filter output port with a negligible pressure drop.

The primary pump may have a characteristic pumping capacity capable of generating a fluid flow of between approximately 150 standard cubic feet per hour and approximately 1500 standard cubic feet per hour. The storage tank, the filter system, and the primary and secondary pumps are preferably arranged such that the storage tank and additional portions of the fuel storage system operate below atmospheric pressure.

The fuel storage system may include a plurality fuel vapor ducts. The plurality of fuel vapor ducts may define a plurality of flow paths therein extending from the filter input port to the primary filter output port. Each of the plurality of fuel vapor ducts may form separate portions of the air-permeable partition so as to pass and inhibit respective portions of the non-pollutant component and the pollutant component. Each of the plurality of fuel vapor ducts may be enclosed within a common fuel vapor duct enclosure. The filter input port, the primary filter output port, and the secondary filter output port may be formed in the common fuel vapor duct enclosure.

According to another embodiment of the present invention, a method of storing fuel is provided comprising the steps of: (i) providing at least one storage tank including a fuel delivery port, a fluid vent port, and a pollutant return port; (ii) providing an exhaust port; (iii) providing a filter system comprising a filter input port coupled to the fluid vent port, a fuel vapor duct defining a flow path extending from the filter input port to a primary filter output port, wherein the primary filter output port is coupled to the pollutant return port, and wherein at least a portion of the fuel vapor duct forms an air-permeable partition designed to pass an non-pollutant component of fluid within the fuel vapor duct through the permeable partition and designed to inhibit passage of a pollutant component of fluid within the fuel vapor duct through the air-permeable partition, and a secondary filter output port partitioned from the fuel vapor duct by the air-permeable partition and coupled to the exhaust port; (iv) positioning a primary pump to cause fluid to pass from the filter input port at a first volumetric fluid flow rate to the primary filter output port; and (v) positioning at least one secondary pump to cause the non-pollutant component within the fuel vapor duct to pass through the air-permeable partition and the secondary filter output port to the exhaust port at a second volumetric fluid flow rate wherein the second volumetric fluid flow rate is greater than a characteristic average net fluid volume return rate of the fuel storage system.

Accordingly, it is an object of the present invention to provide a fuel storage system including a vent filter assembly that includes a fuel vapor duct defining a flow path extending from the filter input port to a primary filter output port. Further, it is an object of the present invention to provide a filter system and associated pumping hardware designed to optimize the efficiency of the fuel storage system. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
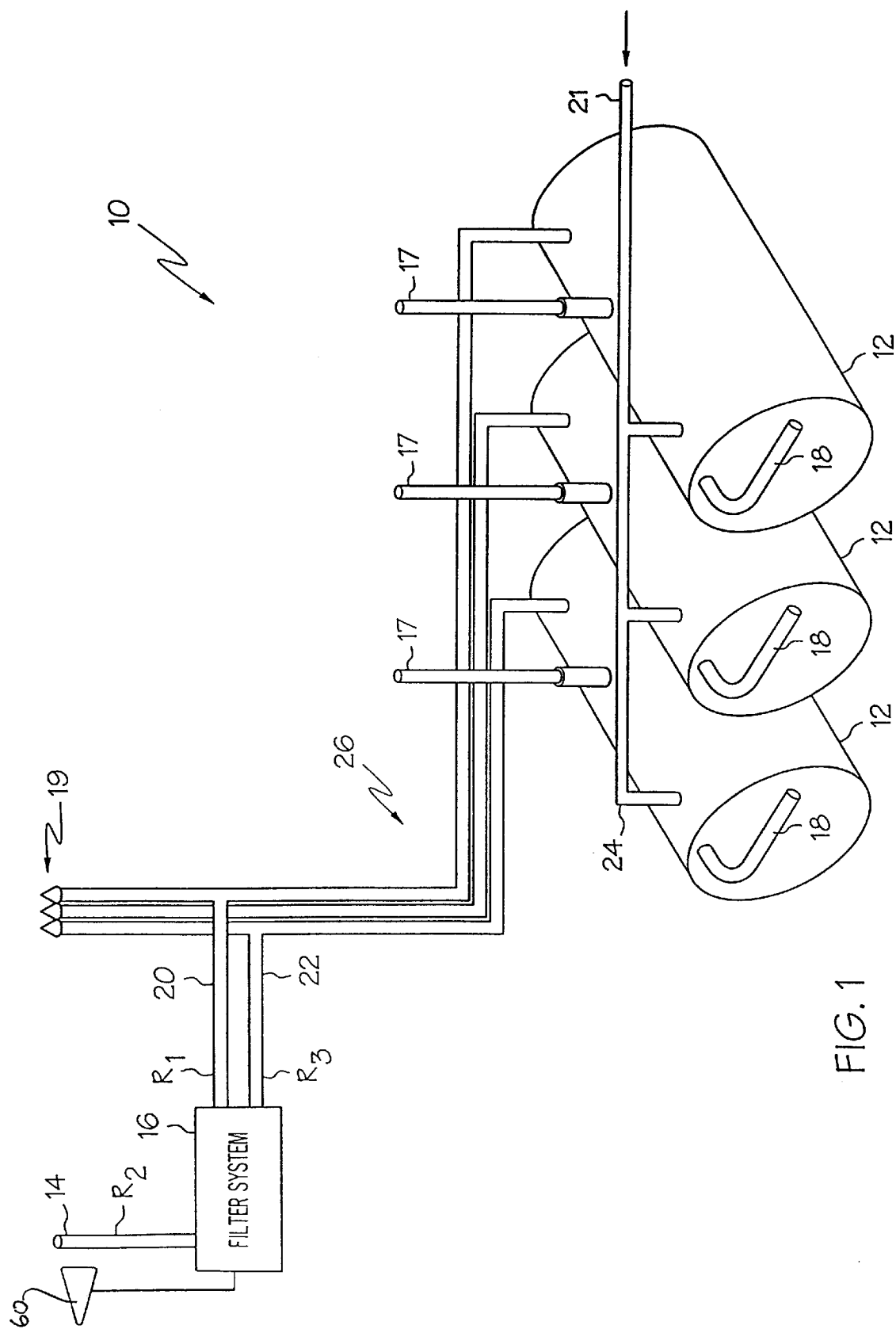
FIG. 1 is a schematic illustration of a fuel storage system according to the present invention.

A fuel storage system 10 according to the present invention is illustrated in FIGS. 1–5. Referring initially to FIG. 1, the fuel storage system 10 comprises a plurality of storage tanks 12, an air exhaust port 14, and a filter system 16. The storage tanks 12 are coupled to fuel inlet ports 17, fuel delivery ports 18, pressure relief ports 19, a fluid vent port 20, a vapor return port 21, a pollutant return port 22, vapor pressure equalization piping 24, and vent piping 26. The fuel dispensing nozzles of the system (not shown) are arranged to return fuel vapor to the storage tanks 12 via the vapor return ports 21. As will be appreciated by those practicing the present invention, the specifics of the design of the storage tanks 12, fuel inlet ports 17, fuel delivery ports 18, pressure relief ports 19, fluid vent port 20, vapor return port 21, pollutant return port 22, vapor pressure equalization piping 24, and vent piping 26, is conventionally available information and is not the subject of the present invention. For example, reference is made to U.S. Pat. No. 5,464,466, issued to Nanaji et al. on Nov. 7, 1995; U.S. Pat. No. 5,484,000, issued to Hasselmann on Jan. 16, 1996; U.S. Pat. No. 4,566,504, issued to Furrow et al. on Jan. 28, 1986; U.S. Pat. No. 4,687,033, issued to Furrow et al. on Aug. 18, 1987; U.S. Pat. No. 5,035,271, issued to Carmack et al. on Jul. 30, 1991; U.S. Pat. No. 5,051,114, issued to Nemser et al. on Sep. 24, 1991; U.S. Pat. No. 5,141,037, issued to Carmack et al. on Aug. 25, 1992; U.S. Pat. No. 5,590,697, issued to Benjey et al. on Jan. 7, 1997; U.S. Pat. No. 5,592,963, issued to Bucci et al. on Jan. 14, 1997; U.S. Pat. No. 5,592,979, issued to Payne et al. on Jan. 14, 1997; U.S. Pat. No. 5,620,030, issued to Dalhart et al. on Apr. 15, 1997; U.S. Pat. No. 5,620,031, issued to Dalhart et al. on Apr. 15, 1997; and U.S. Pat. No. 5,678,614, issued to Grantham on Oct. 21, 1997, the disclosures of which are incorporated herein by reference. It is noted that, for the purposes of describing and defining the present invention, any reference herein to a fluid denotes either a gas, a liquid, a gas/liquid mixture, or a gas, liquid, or gas liquid mixture carrying particulate matter.

Referring now to FIGS. 2–5, the filter system 16 comprises a filter assembly 30, a primary pump or blower 40 coupled to a primary input port 28, and a secondary pump 50. The filter assembly 30 includes a filter input port 32, a plurality of fuel vapor ducts 34 (see FIGS. 3 and 4), a primary filter output port 36, and a secondary filter output port 38. The filter input port 32 is directly coupled to the fluid vent port 20 illustrated in FIG. 1 and the primary filter output port 36 is directly coupled to the pollutant return port 22, also illustrated in FIG. 1. The filter assembly 30 is a product available from Compact Membrane Systems Inc., Wilmington, Del.

The fuel vapor ducts 34 define a substantially unobstructed flow path 35 extending from the filter input port 32 to the primary filter output port 36. At least a portion of, and preferably all of, each fuel vapor duct 34 forms an air-permeable partition 37 designed to pass an air component of fluid within the fuel vapor duct 34 through the air permeable partition 37, see directional arrows 33 in FIG. 3. Passage of a pollutant component of fluid, e.g., VOC's, within the fuel vapor duct 34 through the air-permeable partition 37 is inhibited. Specifically, the air-permeable partition 37 comprises an air-permeable membrane 44 supported by a porous tube 46 and the substantially unobstructed flow path 35 extends along a longitudinal axis of the porous tube 46.

It is noted that, although the air permeable partition 37 of the present invention is referred to herein as air-permeable, the membrane may actually favor the passage of oxygen over nitrogen, creating a nitrogen enriched VOC stream in which fuel vapor condenses. It is also noted that the air permeable partition 37 of the present invention is also designed to pass a water vapor component of fluid within the fuel vapor duct 34 through the air permeable partition 37. The passage of the water vapor component reduces water vapor contamination of the fuel supply overall. This aspect of the present invention is particularly advantages when using fuel components having an affinity for water vapor.

Figure 4:
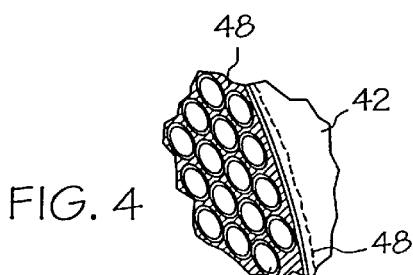
FIG. 4 is a blown up view, partially broken away, of a portion of the filter assembly illustrated in FIG. 3.
Figure 5:
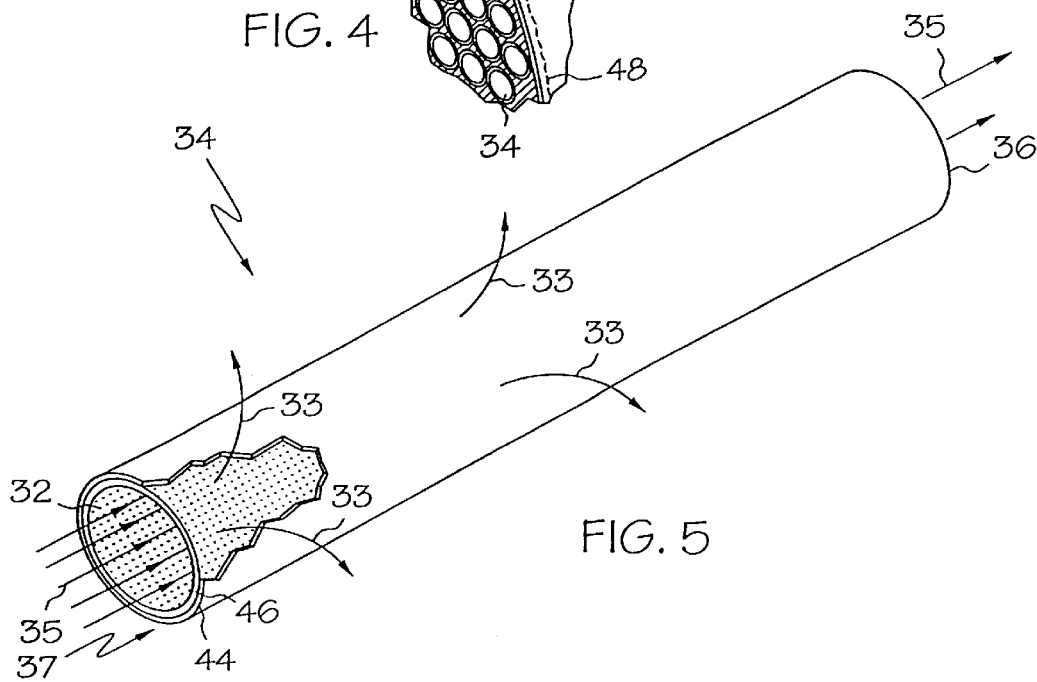
FIG. 5 is an illustration, partially broken away, of a fuel vapor duct portion of a fuel storage system according to the present invention.

Referring to FIG. 4, it is noted that a potting compound 48 is preferably interposed between opposite end portions of adjacent fuel vapor ducts 34 to ensure that all of the fluid incident upon the filter input port 32 is forced to pass through the interior of the fuel vapor ducts 34, as opposed to through the spaces between the fuel vapor ducts 34. For the purposes of describing and defining the present invention, it is noted that when reference is made herein to the substantially unobstructed flow path 35, the presence of the potting compound 48 is not considered to be a substantial obstruction.

Referring to FIGS. 1, 2, 3, and 5, the secondary filter output port 38 is partitioned from the fuel vapor duct 34 by the air-permeable partition 37 and is directly coupled to the air exhaust port 14. The primary pump 40 is positioned to cause fluid to pass from the filter input port 32 through each fuel vapor duct 34 to the primary filter output port 36. The secondary pump 50 is positioned to cause the air component within the fuel vapor duct 34 to pass through the air-permeable partition 37 to the secondary filter output port 38 and the air exhaust port 14.

Figure 3:
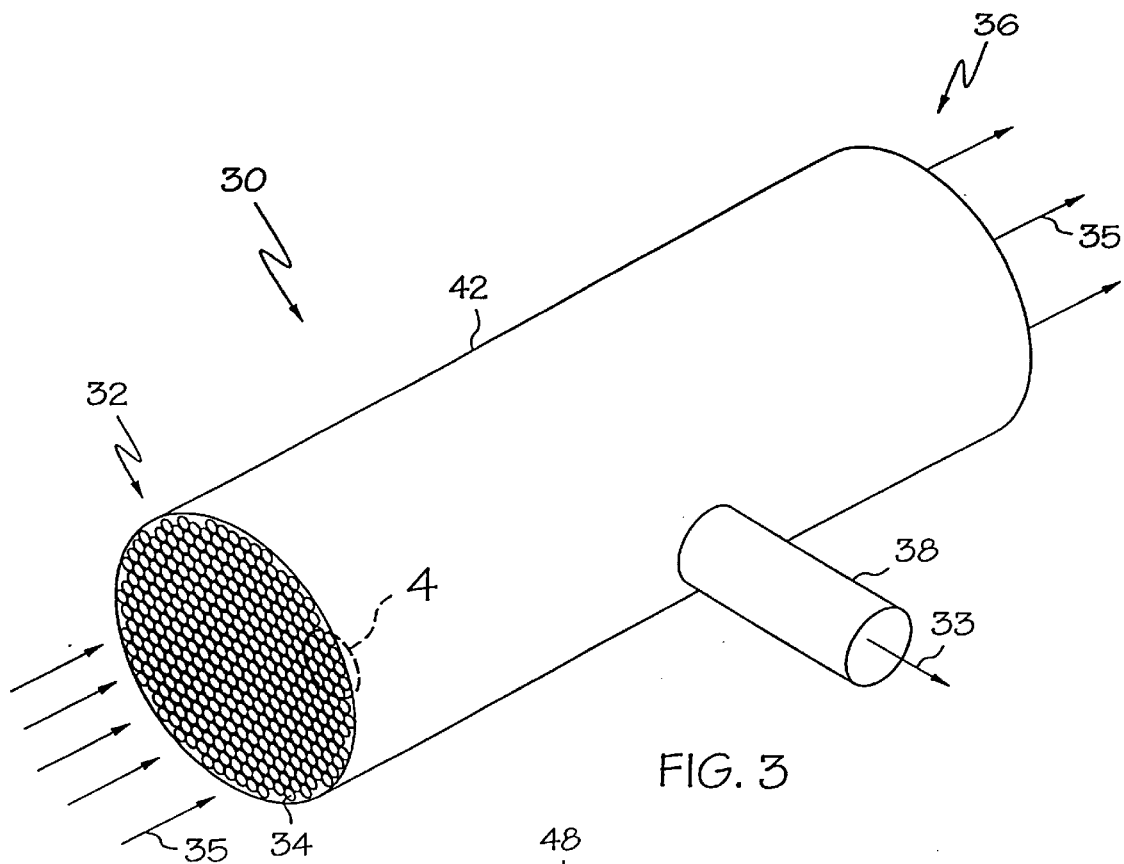
FIG. 3 is an illustration of a filter assembly portion of a fuel storage system according to the present invention.

As is clearly illustrated in FIG. 3, the filter system 16 includes a plurality fuel vapor ducts 34 that define respective substantially linear unobstructed flow paths 35 therein extending from the filter input port 32 to the primary filter output port 36. Each of the fuel vapor ducts 34 form separate portions of a collective air-permeable partition 37 and are enclosed within a common fuel vapor duct enclosure 42. The filter input port 32, the primary filter output port 36, and the secondary filter output port 38 are formed in the common fuel vapor duct enclosure 42. The arrangement of the fuel vapor ducts 34 and the primary pump 40 is such that fluid passes from the filter input port 32 through the fuel vapor ducts 34 to the primary filter output port 36 with a negligible pressure drop. This negligible pressure drop is largely attributable to the unobstructed nature of the flow paths 35.

Figure 2:
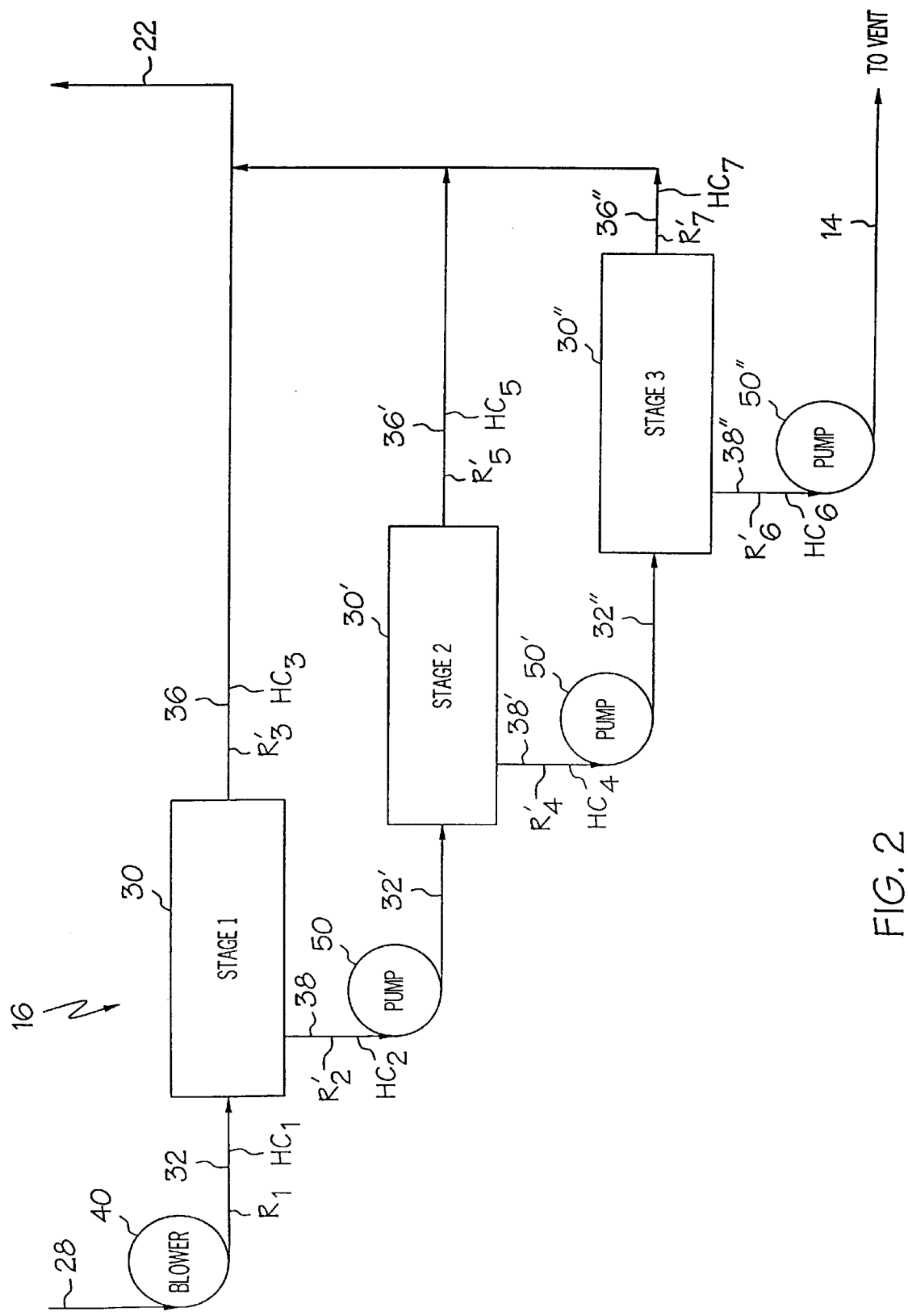
FIG. 2 is a schematic illustration of a filter system portion of a fuel storage system according to the present invention.

Reference will now be made to FIGS. 1 and 2 in discussing the characteristics of the primary pump or blower 40 and the secondary pump 50, and the various flow rates generated within the system 16. The primary pump 40 has a characteristic pumping capacity capable of generating a first volumetric fluid flow rate $R_1$. Specifically, in some preferred embodiments of the present invention, the primary pump 40 has a characteristic pumping capacity capable of generating a fluid flow of between approximately 150 standard cubic feet per hour and approximately 1500 standard cubic feet per hour. In one embodiment of the present invention, the primary pump 40 has a characteristic pumping capacity capable of generating a fluid flow of approximately 320 standard cubic feet per hour. The secondary pump 50 has a characteristic pumping capacity capable of generating, in combination with any downstream pumps, a second volumetric fluid flow rate $R_2$ through the air permeable partition 37 to the secondary filter output port 38. Additionally, the secondary pump 50 has a characteristic pumping capacity capable of generating, in combination with the primary pump 40, a third volumetric fluid flow rate $R_3$ through the fuel vapor ducts 34 to the primary filter output port 36.

Fuel storage systems employing vapor return hardware are characterized by an average net fluid volume return rate which is the difference between the volume of vapor returned to the storage tanks of the system and the volume of fluid dispensed to a fuel receiving tank or lost to the ambient. The volume of returned vapor tends to pressurize the storage system. The second volumetric fluid flow rate $R_2$ is selected such that it is greater than a characteristic average net fluid volume return rate of the fuel storage system to ensure that harmful pollutants are not vented to the ambient due to over pressurization, and to ensure that the filter system 16 of the present invention operates at maximum efficiency. For example, in a typical fuel storage system utilized to dispense on the order of 250,000 gallons of fuel per month, the second volumetric fluid flow rate $R_2$ is approximately 40 standard cubic feet per hour. Further, the first volumetric fluid flow rate $R_1$ is preferably approximately two to eight times the value of the second volumetric fluid flow rate $R_2$. The specific value of the selected second volumetric fluid flow rate $R_2$ is largely dependent upon the average fuel dispensing rate of the particular fuel storage system, however, it is contemplated by the present invention that, in many preferred embodiments of the present invention, the second volumetric fluid flow rate $R_2$ is between approximately 15 standard cubic feet per hour and approximately 150 standard cubic feet per hour.

The characteristics of the filter system 16 of the present invention allow the secondary pump 50 to be designed to create a pressure drop of about 50 kPa across the air-permeable partition 37. In some embodiments of the present invention, it is contemplated that the secondary pump 50 may be designed to create a pressure drop of between approximately 25 kPa and approximately 75 kPa or, more preferably, between approximately 37.5 kPa and approximately 62.5 kPa across the air-permeable partition 37. All of these values represent a significant departure from the storage system of U.S. Pat. No. 5,571,310, where harmful VOC's from a storage system, as opposed to non-polluting air components from the storage system, are drawn through a membrane by using a vacuum pump to create a pressure drop of about one atmosphere (100 kPa) across the membrane.

Referring now specifically to FIG. 2, in a preferred embodiment of the present invention, additional secondary pumps 50', 50" are employed in the filter system 16 of the present invention. As will be appreciated by those practicing the present invention, the first filter assembly 30, the primary pump 40, and the secondary pump 50, are substantially as described above. However, in the embodiment illustrated in FIG. 2, the fuel storage system 10 comprises two additional filter assemblies 30', 30" connected in series such that: (i) the secondary pump 30 has a characteristic pumping capacity capable of generating a second volumetric fluid flow rate $R_2'$ through the air permeable partition 37 to the secondary filter output port 38, and capable of generating, in combination with the primary pump 40, a third volumetric fluid flow rate $R_3'$ through the primary filter output port 36; (ii) the first additional secondary pump 50' has a characteristic pumping capacity capable of generating a fourth volumetric fluid flow rate $R_4'$ through an additional air permeable partition 37 to an additional secondary filter output port 38', and capable of generating, in combination with the secondary pump 50, a fifth volumetric fluid flow rate $R_5'$ through an additional primary filter output port 36'; (iii) the second additional secondary pump 50" has a characteristic pumping capacity capable of generating a sixth volumetric fluid flow rate $R_6'$ through a second additional air permeable partition 37 to a second additional secondary filter output port 38" coupled to the air exhaust port 14, and capable of generating, in combination with the additional secondary pump 50', a seventh volumetric fluid flow rate $R_7'$ through a second additional primary filter output port 36"; and such that (iv) the sixth volumetric fluid flow rate $R_6'$ is greater than a characteristic average net fluid volume return rate of the fuel storage system 12. To maximize system efficiency, the volumetric fluid flow rate through the air exhaust port 14 is approximately two to five times greater than the characteristic average net fluid volume return rate, or at least two times greater than the characteristic average net fluid volume return rate.

An additional filter input port 32' is coupled to the secondary filter output port 38 and a second additional filter input port 32" is coupled to the additional secondary filter output port 38'. An additional primary filter output port 36' and a second additional primary filter output port 36" are coupled to the pollutant return port 22. Referring to FIG. 2, the preferred flow rates (R) and associated hydrocarbon concentrations (HC) for one embodiment of the present invention are as follows, where $HC_6$ represents the hydrocarbon concentration of the fluid vented to the atmosphere:

| Flow Rate standard cubic feet per hour (scfh) | Hydrocarbon Concentration % of fluid flow |
|---|---|
| $R_1$ = 320 scfh | $HC_1$ = 80% |
| $R_2'$ = 160 scfh | $HC_2$ = 59.93% |
| $R_3'$ = 160 scfh | $HC_3$ = 99.998% |
| $R_4'$ = 80 scfh | $HC_4$ = 25.54% |
| $R_5'$ = 80 scfh | $HC_5$ = 95.01% |
| $R_6'$ = 40 scfh | $HC_6$ = 1.54% |
| $R_7'$ = 40 scfh | $HC_7$ = 47.61% |

Because the hydrocarbon concentration of the fluid vented to the atmosphere $HC_6$ is on the order of about 1%, it is possible to eliminate VOC emissions entirely by installing a microwave unit 60 proximate the air exhaust port 14. The microwave unit 60 is tuned to break down any remaining VOC's in the exhaust stream.

In the embodiment illustrated in FIG. 2, the volumetric fluid flow rate through the air exhaust port 14 is selected such that it is greater than a characteristic average net fluid volume return rate of the fuel storage system 10 to ensure that harmful pollutants are not vented to the ambient due to over pressurization, and to ensure that the filter system 16 of the present invention operates at maximum efficiency. The specific value of the selected second volumetric fluid flow rate $R_2$ is largely dependent upon the average fuel dispensing rate of the particular fuel storage system, however, it is contemplated by the present invention that, in many preferred embodiments of the present invention, the volumetric fluid flow rate through the air exhaust port 14 is between approximately 15 standard cubic feet per hour and approximately 150 standard cubic feet per hour, or, more specifically, 40 standard cubic feet per hour.

It is contemplated by the present invention that, if only one additional filter assembly 30' is utilized according to the present invention, the primary filter pump 40, the secondary filter pump 50, and the additional secondary pump 50' are preferably characterized by respective pumping capacities capable of generating a volumetric fluid flow rate through the air exhaust port 14 greater than the characteristic average net fluid volume return rate of the system.

The characteristics of the filter system 16 of the present invention allow the additional secondary pumps 50', 50" to be designed to create a pressure drop of about 50 kPa across the respective air-permeable partitions 37. In some embodiments of the present invention, it is contemplated that the additional secondary pumps 50', 50" may be designed to create a pressure drop of between approximately 25 kPa and approximately 75 kPa or, more preferably, between approximately 37.5 kPa and approximately 62.5 kPa across the respective air-permeable partitions 37.

The above-described characteristics of the filter system 16 of the present invention also allow the system, or at least major portions thereof, to be operated below atmospheric pressure. Operation below atmospheric pressure further reduces fugitive emissions. In fact, system leaks in general are less problematic because the leaks will not lead to the release of fugitives into the atmosphere. Rather, air from the atmosphere will tend to leak into the system because the system is operated below atmospheric pressure.

Having described the invention in detail and by reference to preferred embodiments thereof, it will be apparent that modifications and variations are possible without departing from the scope of the invention defined in the appended claims.

What is claimed is:

1. A fuel storage system comprising:
    at least one storage tank including a fuel delivery port, a fluid vent port, and a pollutant return port;
    an exhaust port;
    a filter system comprising
        a filter input port coupled to said fluid vent port,
        a fuel vapor duct defining a flow path extending from said filter input port to a primary filter output port, wherein
            said primary filter output port is coupled to said pollutant return port, and wherein
            at least a portion of said fuel vapor duct forms a permeable partition designed to pass a non-pollutant component of fluid within said fuel vapor duct through said permeable partition and designed to inhibit passage of a pollutant component of fluid within said fuel vapor duct through said partition, and
        a secondary filter output port partitioned from said fuel vapor duct by said air-permeable partition and coupled to said exhaust port;
    a primary pump positioned to cause fluid to pass from said filter input port to said primary filter output port; and
    at least one secondary pump positioned to cause said non-pollutant component within said fuel vapor duct to pass through said permeable partition to said secondary filter output port and said exhaust port.

2. A fuel storage system as claimed in claim 1 wherein:
    said primary pump has a characteristic pumping capacity capable of generating a first volumetric fluid flow rate;
    said secondary pump has a characteristic pumping capacity capable of generating a second volumetric fluid flow rate through said permeable partition and said secondary filter output port to said exhaust port, and capable of generating, in combination with said primary pump, a third volumetric fluid flow rate through said primary filter output port; and wherein
    said second volumetric fluid flow rate is greater than a characteristic average net fluid volume return rate of said fuel storage system.

3. A fuel storage system as claimed in claim 2 wherein the second volumetric flow rate is approximately two to five times greater than the average net fluid volume return rate of said fuel storage system.

4. A fuel storage system as claimed in claim 2 wherein the second volumetric flow rate is at least approximately two times greater than the average net fluid volume return rate of said fuel storage system.

5. A fuel storage system as claimed in claim 2 wherein said first volumetric fluid flow rate is approximately two to eight times the value of said second volumetric fluid flow rate.

6. A fuel storage system as claimed in claim 2 wherein said second volumetric fluid flow rate is between approximately 15 standard cubic feet per hour and approximately 150 standard cubic feet per hour.

7. A fuel storage system as claimed in claim 2 wherein said second volumetric fluid flow rate is approximately 40 standard cubic feet per hour.

8. A fuel storage system as claimed in claim 2 wherein said secondary pump is designed to create a pressure drop of less than 100 kPa across said permeable partition.

9. A fuel storage system as claimed in claim 2 wherein said secondary pump is designed to create a pressure drop of approximately 50 kPa across said permeable partition.

10. A fuel storage system as claimed in claim 2 wherein said secondary pump is designed to create a pressure drop of between approximately 25 kPa and approximately 75 kPa across said permeable partition.

11. A fuel storage system as claimed in claim 2 wherein said secondary pump is designed to create a pressure drop of between approximately 37.5 kPa and approximately 62.5 kPa across said permeable partition.

12. A fuel storage system as claimed in claim 1 wherein said primary pump has a characteristic pumping capacity capable of generating a fluid flow of between approximately 150 standard cubic feet per hour and approximately 1500 standard cubic feet per hour.

13. A fuel storage system as claimed in claim 1 wherein said primary pump has a characteristic pumping capacity capable of generating a fluid flow of approximately 320 standard cubic feet per hour.

14. A fuel storage system as claimed in claim 1 wherein:
said filter system includes a plurality fuel vapor ducts;
said plurality of fuel vapor ducts define a plurality of flow paths therein extending from said filter input port to said primary filter output port;
each of said plurality of fuel vapor ducts form separate portions of said permeable partition so as to pass and inhibit respective portions of said non-pollutant component and said pollutant component;
each of said plurality of fuel vapor ducts are enclosed within a common fuel vapor duct enclosure; and
said filter input port, said primary filter output port, and said secondary filter output port are formed in said common fuel vapor duct enclosure.

15. A fuel storage system as claimed in claim 1 wherein said storage tank, said filter system, and said primary and secondary pumps are arranged such that said storage tank and additional portions of said fuel storage system operate below atmospheric pressure.

16. A fuel storage system as claimed in claim 1 wherein said fuel vapor duct and said primary pump are arranged such that fluid passes from said filter input port to said primary filter output port with a negligible pressure drop.

17. A fuel storage system as claimed in claim 1 wherein said non-pollutant component comprises oxygen.

18. A fuel storage system as claimed in claim 1 wherein said non-pollutant component comprises water vapor.

19. A fuel storage system as claimed in claim 1 further comprising a microwave unit arranged to direct microwave radiation at fluid released through said exhaust port.

20. A method of storing fuel comprising the steps of:
providing at least one storage tank including a fuel delivery port, a fluid vent port, and a pollutant return port;
providing an exhaust port;
providing a filter system comprising
a filter input port coupled to said fluid vent port,
a fuel vapor duct defining a flow path extending from said filter input port to a primary filter output port, wherein
said primary filter output port is coupled to said pollutant return port, and wherein
at least a portion of said fuel vapor duct forms an air-permeable partition designed to pass an non-pollutant component of fluid within said fuel vapor duct through said permeable partition and designed to inhibit passage of a pollutant component of fluid within said fuel vapor duct through said air-permeable partition;
a secondary filter output port partitioned from said fuel vapor duct by said air-permeable partition and coupled to said exhaust port;
positioning a primary pump to cause fluid to pass from said filter input port at a first volumetric fluid flow rate to said primary filter output port; and
positioning at least one secondary pump to cause said non-pollutant component within said fuel vapor duct to pass through said air-permeable partition and said secondary filter output port to said exhaust port at a second volumetric fluid flow rate wherein said second volumetric fluid flow rate is greater than a characteristic average net fluid volume return rate of said fuel storage system.

21. A fuel storage system comprising:
at least one storage tank including a fuel delivery port, a fluid vent port, and a pollutant return port;
an exhaust port;
a filter system comprising
a filter input port coupled to said fluid vent port,
a fuel vapor duct defining a flow path extending from said filter input port to a primary filter output port, wherein at least a portion of said fuel vapor duct forms a permeable partition, and
a secondary filter output port partitioned from said fuel vapor duct by said permeable partition; and
at least one pump positioned to cause fluid to pass through said filter input port, wherein said storage tank, said filter system, and said pump are arranged such that said storage tank and additional portions of said fuel storage system operate below atmospheric pressure.

22. A fuel storage system comprising:
at least one storage tank including a fuel delivery port, a fluid vent port, and a pollutant return port;
an exhaust port;
a filter system comprising
a filter input port coupled to said fluid vent port,
a fuel vapor duct defining a flow path extending from said filter input port to a primary filter output port, wherein
said primary filter output port is coupled to said pollutant return port, and wherein
at least a portion of said fuel vapor duct forms a permeable partition designed to pass a non-pollutant component of fluid within said fuel vapor duct through said permeable partition and designed to inhibit passage of a pollutant component of fluid within said fuel vapor duct through said partition, and a secondary filter output port partitioned from said fuel vapor duct by said permeable partition and coupled to said exhaust port; and at least one pump positioned to cause fluid to pass through said filter input port, wherein said storage tank, said filter system, and said pump are arranged such that said storage tank and additional portions of said fuel storage system operate below atmospheric pressure.

23. A fuel storage system comprising:

at least one storage tank including a fuel delivery port, a fluid vent port, and a pollutant return port;

an exhaust port;

a filter system comprising a filter input port and a filter output port, wherein said filter input port is coupled to said fluid vent port and said filter output port is coupled to said exhaust port;

at least one pump positioned to cause fluid to pass through said filter system; and a microwave unit arranged to direct microwave radiation at fluid released through said exhaust port.

* * * * *